US012664678B1

(12) United States Patent
Li et al.

(10) Patent No.: US 12,664,678 B1
(45) Date of Patent: Jun. 23, 2026

(54) SYSTEMS FOR GENERATING OUTPUT BASED ON ORIENTATION OF AN INPUT IMAGE

(71) Applicant: AMAZON TECHNOLOGIES, INC., Seattle, WA (US)

(72) Inventors: Yuelong Li, Santa Clara, CA (US); Amogh Gupta, New York, NY (US); Meher Gitika Karumuri, Santa Clara, CA (US); Sunil Sharadchandra Hadap, Dublin, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 373 days.

(21) Appl. No.: 18/362,419

(22) Filed: Jul. 31, 2023

(51) Int. Cl.
    *G06T 7/70*     (2017.01)
    *G06T 17/00*     (2006.01)
    *G06V 10/764*     (2022.01)

(52) U.S. Cl.
    CPC ............... *G06T 7/70* (2017.01); *G06T 17/00* (2013.01); *G06V 10/764* (2022.01)

(58) Field of Classification Search
    None
    See application file for complete search history.

(56) References Cited

U.S. PATENT DOCUMENTS

| | | | |
|---|---|---|---|
| 10,970,330 B1 * | 4/2021 | Bhogal | ................ G06F 16/532 |
| 2020/0250879 A1 * | 8/2020 | Foster | ....................... G06T 7/70 |
| 2022/0101417 A1 * | 3/2022 | Boscolo | ............ G06Q 30/0633 |
| 2025/0259364 A1 * | 8/2025 | Chen | ....................... A63F 13/55 |

* cited by examiner

*Primary Examiner* — Leon Viet Q Nguyen
(74) *Attorney, Agent, or Firm* — Lindauer Law, PLLC

(57) ABSTRACT

An image depicting a portion of a user's body in a first orientation is processed using a classifier to determine a class associated with a second orientation similar to the first orientation. The determined class is associated with an angular value relative to a reference axis. To generate an output that depicts the item in association with the user's body, such as worn, while depicting the item in the correct orientation, a regression process is used based on a difference between the orientation in the input image and the orientation represented by the angular value for the determined class. Classification of an input image to determine an initial orientation associated with the class prior to using a regression process reduces the distance that a three-dimensional model representing the item is rotated when generating an output that aligns the item with the body of the user, resulting in improved accuracy.

20 Claims, 6 Drawing Sheets

TO FIG. 2B

ORIENTATION CLASSES 118

ORIENTATION CLASS (OC) 118(1)    CLASS ANGULAR VALUE(S) (CAV) 120(1)

X: 0
Y: 0
Z: 0

OC 118(6)    CAV(s) 120(6)

X: 0
Y: -90
Z: 0

OC 118(11)    CAV(s) 120(11)

X: 0
Y: -90
Z: 180

OC 118(2)    CAV(s) 120(2)

X: 180
Y: 0
Z: 0

OC 118(7)    CAV(s) 120(7)

X: 0
Y: -90
Z: 90

OC 118(12)    CAV(s) 120(12)

X: 0
Y: -90
Z: -90

OC 118(3)    CAV(s) 120(3)

X: 0
Y: 0
Z: 180

OC 118(8)    CAV(s) 120(8)

X: 180
Y: 0
Z: 180

OC 118(13)    CAV(s) 120(13)

X: 90
Y: 0
Z: 90

OC 118(4)    CAV(s) 120(4)

X: 0
Y: 90
Z: 0

OC 118(9)    CAV(s) 120(9)

X: 0
Y: 90
Z: 90

OC 118(14)    CAV(s) 120(14)

X: -90
Y: 0
Z: 90

OC 118(5)    CAV(s) 120(5)

X: 0
Y: 90
Z: 180

OC 118(10)    CAV(s) 120(10)

X: 0
Y: 90
Z: -90

OC 118(15)    CAV(s) 120(15)

X: 90
Y: 0
Z: -90

OC 118(16)    CAV(s) 120(16)

X: -90
Y: 0
Z: -90

400

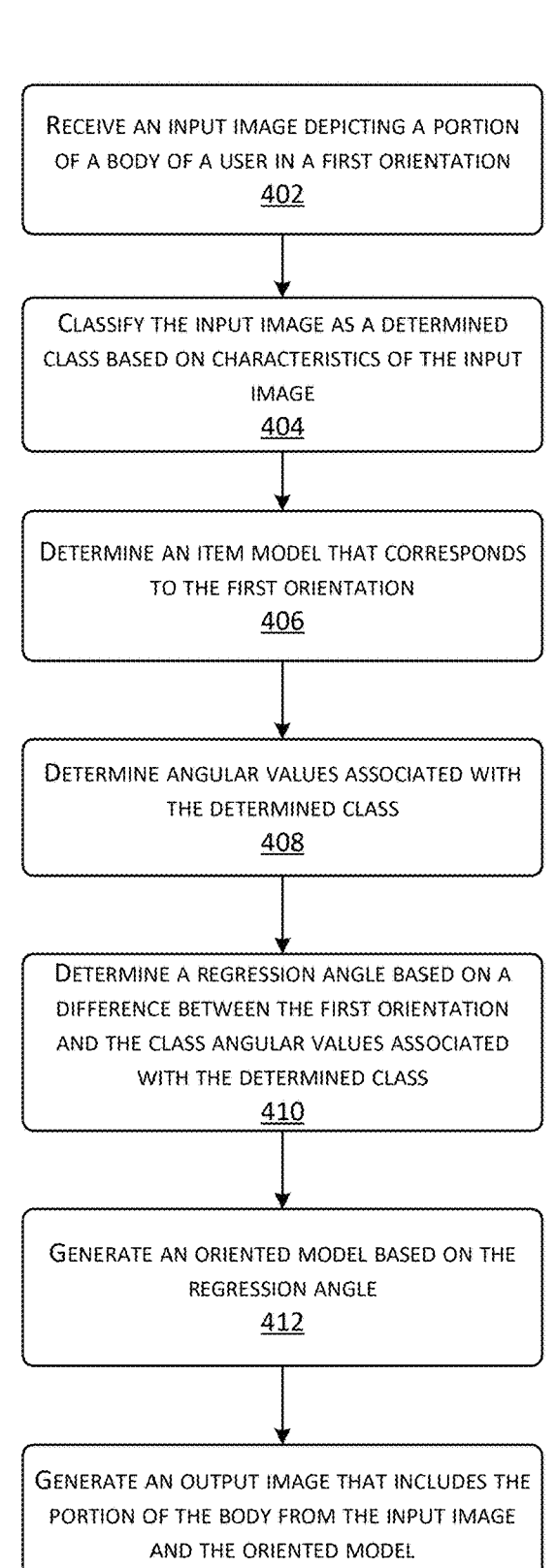

RECEIVE AN INPUT IMAGE DEPICTING A PORTION OF A BODY OF A USER IN A FIRST ORIENTATION
402

CLASSIFY THE INPUT IMAGE AS A DETERMINED CLASS BASED ON CHARACTERISTICS OF THE INPUT IMAGE
404

DETERMINE AN ITEM MODEL THAT CORRESPONDS TO THE FIRST ORIENTATION
406

DETERMINE ANGULAR VALUES ASSOCIATED WITH THE DETERMINED CLASS
408

DETERMINE A REGRESSION ANGLE BASED ON A DIFFERENCE BETWEEN THE FIRST ORIENTATION AND THE CLASS ANGULAR VALUES ASSOCIATED WITH THE DETERMINED CLASS
410

GENERATE AN ORIENTED MODEL BASED ON THE REGRESSION ANGLE
412

GENERATE AN OUTPUT IMAGE THAT INCLUDES THE PORTION OF THE BODY FROM THE INPUT IMAGE AND THE ORIENTED MODEL
414

FIG. 4

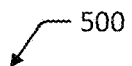

COMPUTING DEVICE(S) 502

POWER SUPPLY
504

PROCESSOR(S)
506

CLOCK(S)
508

COMMUNICATION
INTERFACE(S) 510

I/O INTERFACE(S)
512

NETWORK
INTERFACE(S) 514

I/O DEVICE(S) 516

MEMORY 518

OPERATING SYSTEM MODULE
520

COMMUNICATION MODULE
524

ORIENTATION CLASSIFICATION
MODULE 110

ITEM MODEL DETERMINATION
MODULE
116

REGRESSION MODULE
124

OUTPUT MODULE
132

OTHER MODULE(S)
526

DATA STORE 522

CLASS DATA 112

ORIENTATION CLASSES 118

CLASS ANGULAR VALUES 120

REGRESSION DATA 130

OTHER DATA 528

SYSTEMS FOR GENERATING OUTPUT BASED ON ORIENTATION OF AN INPUT IMAGE

BACKGROUND

Some online stores, and other types of interfaces, may enable users to examine items using an augmented reality (AR) or virtual-try-on (VTO) process in which output is presented that depicts an item superimposed over an image of a user's body to create the appearance of the user wearing the item. However, maintaining a consistent orientation between the virtual item and the image of the user's body may be subject to inaccuracy, resulting in misalignment of images and other negative user experiences, especially if the user attempts to view the item from different angles.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 is a flow diagram depicting an implementation of a method for determining an output based on an input image that depicts a portion of a body of a user.

FIG. 5 is a block diagram depicting an implementation of a computing device within the present disclosure.

Figure 1:
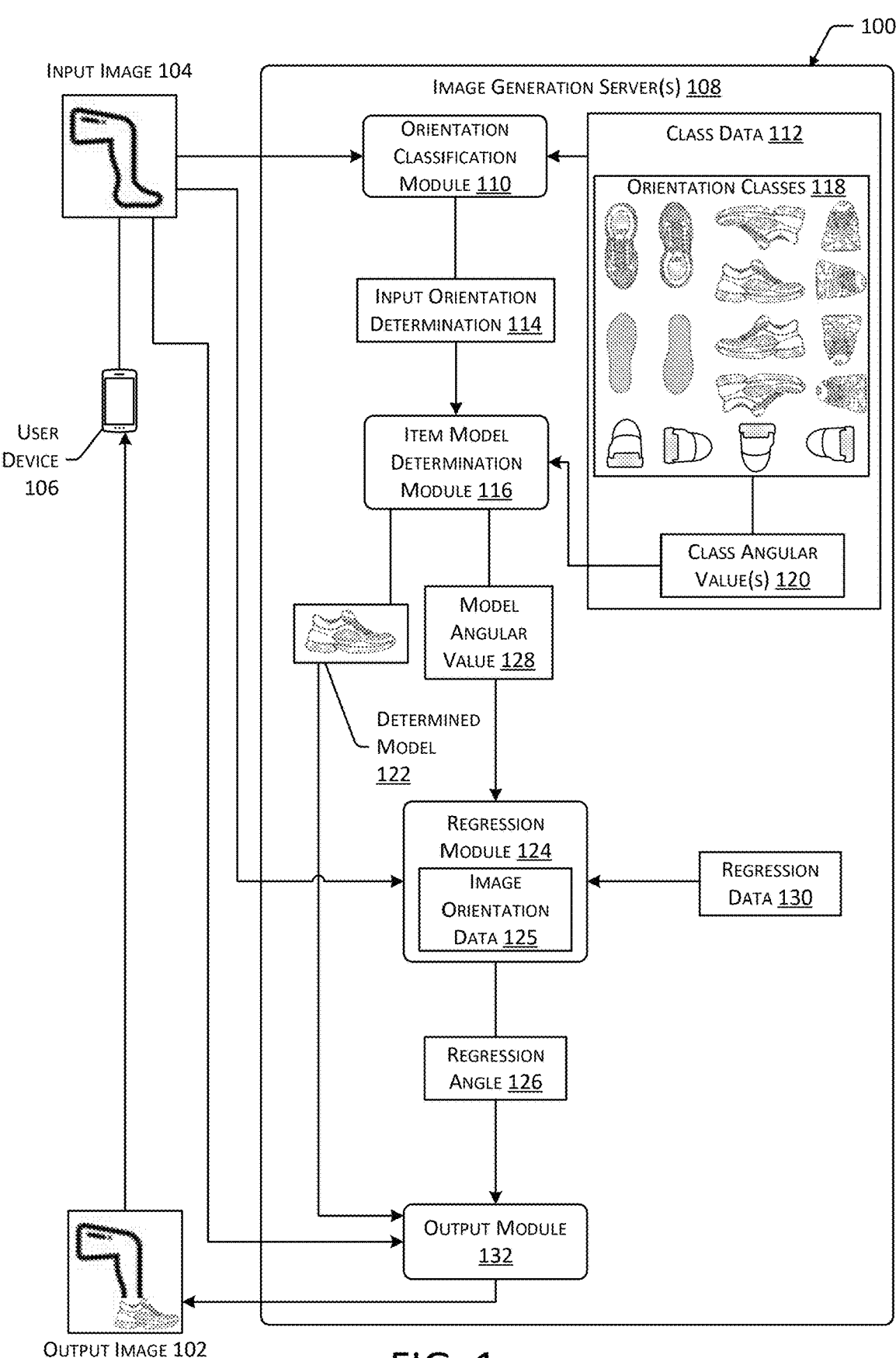
FIG. 1 is a diagram depicting an implementation of a system for determining an output image that depicts an item in association with a portion of a body of a user depicted in an input image.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

An online store may offer items for purchase and may present information associated with the items, such as text descriptions, images, and so forth. In some cases, an online store may offer augmented reality (AR) or virtual-try-on (VTO) functionality, in which a user may provide an image of a portion of the user's body, or that of another individual. The image provided by the user and one or more images or three-dimensional (3D) models of the item may be used to generate an output image that shows the item in association with the individual, such as by depicting the individual wearing the item. Most items for which VTO functionality is available are associated with a "primary" orientation that may commonly be viewed by users. For example, a user examining a pair of shoes may commonly acquire an image of the top of a foot, such as by holding a camera above the foot while standing or sitting. In such a case, an image that depicts the top surface of a shoe superimposed over the image of the foot may be generated to provide the appearance that the shoe is being worn by the user. If the user moves or attempts to obtain an output that depicts the foot and item from other orientations, the image or a three-dimensional (3D) model of the shoe must typically be rotated or otherwise manipulated to remain positioned over the location of the foot within the image. Significant inaccuracy may be introduced into the VTO process when an item is rotated or otherwise moved a significant distance. For example, after a significant amount of rotation, shoes or other types of clothing or wearable items may appear misaligned relative to the body of the user depicted in the output image, creating a negative user experience.

Described in this disclosure are techniques for improving the accuracy of output images that depict an item worn by or otherwise shown in association with the body of a user, across multiple orientations and viewpoints. The techniques described herein reduce the amount that a rendered 3D model representing the item is rotated to position the model in an orientation that is aligned with the body of the user depicted in the output image.

An input image may be received that depicts a portion of a body of a user in a first orientation. For example, a user may acquire an image of the user's foot using a camera of a user device. The foot may be positioned in an orientation that facilitates examination of a desired portion of a shoe. For example, the user may acquire an image that depicts the side of the user's foot to enable the side of the shoe to be presented in an output image.

The input image may be provided to a classifier or other type of machine learning system that is trained to classify input images based on the characteristics of the pixels of an image that are indicative of orientation of the body of the user. For example, a classifier may be trained to classify images as one or more of a set of orientations. The classifier may use characteristics of an image as inputs and determine confidence scores indicating a likelihood that the input image depicts the body of the user in one or more of the orientations. Continuing the example, each orientation of the set of orientations may represent a respective side or viewpoint of an item. Additionally, each orientation may be associated with an angular value that represents the angular rotation relative to a reference axis, such as an axis of a primary viewpoint associated with an item. For example, the primary viewpoint for a shoe may be the top surface of the shoe. Each orientation of the set of orientations may represent an angular rotation about one or more of the three axes of rotation (e.g., x/y/z or yaw/pitch/roll) relative to one or more reference axes. Based on the characteristics of the input image, the classifier or other machine learning system may determine correspondence between the input image and a corresponding orientation. For example, the classifier may be trained to determine one of a plurality of possible orientations, each possible orientation representing a range of angles. The corresponding orientation determined using the classifier may represent an orientation that is closest to the orientation of the body of the user in the input image. In other implementations, the classifier may determine correspondence between characteristics of the input image and one or more other images that each depict the item in a respective orientation. For example, output from the classifier may indicate an image of a set of images that is determined to have an orientation that corresponds to the orientation of the input image.

After determining a corresponding orientation associated with the input image, the angular value that is associated with the corresponding orientation may be determined. The angular value may represent the rotation represented by the corresponding orientation relative to a reference axis, such as a primary orientation of the item. A regression estimation process may be used to determine an angle of rotation to be applied to a 3D model representing the item. In some implementations, a regression angle for use in the output image may be determined based on a difference between the orientation of the portion of the body shown in the input image and the angular value associated with the corresponding orientation. For example, the input image may be processed to determine the orientation of the portion of the body that is depicted, which may be represented as one or more angles relative to one or more reference axes. A difference between the orientation of the portion of the body and the angular value(s) associated with the orientation determined using the classifier may represent an amount of rotation to be applied when rendering a 3D model of the item. For example, if the orientation class determined using the classifier is represented bn an angular value of 135 degrees from a reference axis, and the input image depicts an orientation of the body of the user that is rotated 150 degrees from the reference axis, the regression angle for use in the output image may be 15 degrees. Continuing the example, when generating the output image, the 3D model of the item may be rendered at an angle of 135 degrees, then rotated an additional 15 degrees to position the item relative to the associated body part of the user within the image (such as aligned with the foot if the item is a shoe). As such, the rendering process may be used to create an output image (e.g., a 2D image for presentation on a display) based on the 3D model representing the item. For example, in addition to the determined regression angle, a 3D model may be associated with data representing characteristics such as geometry of an item, viewpoint, texture, lighting, shading, and so forth. A rendering program may be used to process this data to generate an output image. Because the 3D model of the item is rotated only a small distance based on the difference between the angular value for the corresponding orientation and the orientation of the user's body in the input image, inaccuracies in the output image such as misalignment between the item and the body of the user may be reduced. For example, rotating a model of the item having the primary orientation a distance of 150 degrees would be more likely to cause inaccuracies in an output image when compared to rotating the model of the item having an initial orientation more similar to that of the input image a distance of only 15 degrees.

FIG. 1 is a diagram 100 depicting an implementation of a system for determining an output image 102 that depicts an item in association with a portion of a body of a user depicted in an input image 104. As described previously, in one example, implementations described herein may be used by an online store or other entity that provides AR or VTO functionality to enable a user to visualize an item. For example, prior to purchasing an item, a user may provide an input image 104 depicting a portion of the user's body to request generation of an output image 102 that depicts the portion of the user's body wearing a selected item. This functionality may increase the likelihood that a user will purchase items that are suitable and meet the needs or interests of the user, and reduce the likelihood that the user will purchase an unsuitable item that may later be subject to a return process, consuming additional time and resources. However potential inaccuracies, such as an output image 102 that depicts an item that is not correctly aligned with the body of the user, or a lack of functionality, such as the inability to generate an output image 102 that depicts certain portions of the item, may result in a negative user experience.

As shown in FIG. 1, a user device 106 may acquire an input image 104 that depicts a portion of a body of a user of the user device 106 or another individual. For example, the user device 106 may include or communicate with a camera, and the user or other individual may position a portion of their body within the field of view of the camera to enable the input image 104 to be acquired. While FIG. 1 depicts the user device 106 as a smartphone, in other implementations, the user device 106 may include any number or type of computing devices including, without limitation, one or more personal computing devices, portable computing devices, wearable computing devices, vehicle-based computing devices, networked media devices, game controllers, servers, and so forth. The user device 106 may send the input image 104 to one or more image generation servers 108, which may generate the output image 102 based in part on the input image 104. While FIG. 1 depicts a single image generation server 108 receiving the input image 104 from the user device 106, the image generation server(s) 108 may include any number and any type of computing devices including, without limitation, the types of computing devices described with regard to the user device 106.

An orientation classification module 110 associated with the image generation server(s) 108 may determine an orientation class associated with the portion of the body depicted in the input image 104 by classifying the input image 104 as one of a plurality of possible orientation classes. For example, the orientation classification module 110 may include one or more classifiers that are trained to determine correspondence between input images and a set of classes or categories that are each indicative of a respective orientation (e.g., a range of angles). Continuing the example, the orientation classification module 110 may access class data 112 indicative of one or more orientation classes 118, each orientation class 118 representing a range of angular orientations relative to one or more axes. For example, an orientation class 118 may correspond to a particular side of an item that is visible (e.g., top, bottom, left, right, front, back), or one or more angular values associated with the item such as a rotation of the item (e.g., yaw, pitch, or roll) relative to one or more reference axes (e.g., X/Y/Z). In some implementations, the orientation classification module 110 may determine confidence scores associated with multiple classes, each confidence score representing a probability that the orientation of the portion of the body depicted in the input image 104 corresponds to the orientation represented by a respective class. For example, the class associated with the greatest confidence score may represent the orientation class 118 that is the most similar to the orientation of the portion of the body depicted in the input image 104. The orientation classification module 110 may generate an input orientation determination 114 indicative of the orientation represented by the determined class. In some implementations, the orientation classification module 110 may determine correspondence between the input image 104 and one or more images of items in various orientations. For example, each class of the class data 112 may be associated with a representative image of an item, one or more representative angular values, and so forth, and correspondence between an image associated with the class data 112 and the input image 104 may indicate that the orientation depicted in the image associated with the class data 112 is similar to that of the input image 104.

An item model determination module 116 associated with the image generation server(s) 108 may access one or more three-dimensional (3D) models that represent an item. For example, a 3D model may be rendered to depict a particular side of an item in a particular orientation based on the orientation class 118 determined for the input image 104. As described previously, each orientation class 118 of the class data 112 may be associated with one or more class angular values 120. A class angular value 120 may represent a rotation of a 3D model relative to a reference axis. For example, FIG. 1 depicts an example implementation in which each orientation class 118 of the class data 112 corresponds to a respective view and orientation of a shoe and may be associated with a respective class angular value 120. When examining a shoe, a primary view for the item may be selected as a view of the top side of the shoe, oriented with the front pointing upward. For example, this orientation would be the approximate orientation of the foot of a user if an input image 104 were acquired by a user holding a camera and facing the camera downward to place the foot of the user in the field of view of the camera. As such, the axes of an item image that depicts a shoe having this orientation may constitute reference axes, and the class angular value(s) 120 associated with a particular orientation class 118 of the class data 112 may represent the amount by which a determined model 122 that represents the item has been rotated relative to one or more of the reference axes.

The item model determination module 116 may determine a particular 3D model (determined model 122) that corresponds to the input orientation determination 114 determined using the orientation classification module 110. For example, the input orientation determination 114 may indicate one or more confidence scores associated with particular classes, and the item model determination module 116 may determine a class associated with the greatest confidence score. As such, the determined model 122 may represent the item in an orientation that is similar to that of the portion of the body of the user presented in the input image 104, but not necessarily identical to the orientation associated with the input image 104. For example, the determined model 122 may represent the class having the orientation that is closest to that of the body depicted in the input image 104, but the orientation classes 118 may not include an orientation that is identical to the orientation associated with the input image 104. Continuing the example, the orientation classes 118 may include a set of orientations that represent common, expected, or selected sets of viewpoints associated with the item that are sufficiently numerous to improve the accuracy of the output image 102, but sufficiently small in number to avoid consumption of a large amount of computational resources. Therefore, each class may correspond to a range of angles. For example, an input image 104 that depicts a body of a user in an orientation that is within a range of angles associated with a particular class may be classified as being associated with that class. In some implementations, the class angular value 120 associated with an orientation class 118 may correspond to the midpoint of the range of angles represented by the class. In the example shown in FIG. 1, the orientation classes 118 include sixteen classes, two of which correspond to the top side of the item in different orientations, two of which correspond to the bottom side of the item in different orientations, two of which correspond to the left side of the item in different orientations, two of which correspond to the right side of the item in different orientations, four of which correspond to the front side of the item in different orientations, and four of which correspond to the back side of the item in different orientations.

A regression module 124 associated with the image generation server(s) 108 may determine a regression angle 126 for use generating the output image 102. The regression angle 126 may be determined based on a difference between the orientation of the portion of the body depicted in the input image 104, and the determined angular value associated with the determined orientation class 118. As described previously, while the determined class may represent an orientation, from among a set of orientations, that is closest to that of the body shown in the input image 104, the orientation classes 118 may not necessarily include a class having an orientation identical to the orientation associated with the input image 104. Each orientation class 118 may be associated with a class angular value 120 that represents the amount that the determined model 122 has been rotated relative to one or more of reference axes, such as the axes representing a primarily viewpoint.

The item model determination module 116, the regression module 124, or another module associated with the image generation server(s) 108 may determine the particular angular value (e.g., the model angular value 128) associated with the determined model 122. The regression module 124 may determine an orientation (e.g., an angular value relative to a reference axis) associated the portion of the body shown in the input image 104, depicted as image orientation data 125. The regression angle 126 may be determined based on a difference between the model angular value 128 and the image orientation data 125 associated with the input image 104. For example, the regression angle 126 may represent an amount of rotation to be applied to the item represented by the determined model 122 to position the 3D model in an orientation that corresponds to the orientation of the body depicted in the input image 104. In some implementations, the regression module 124 may access regression data 130 indicative of one or more rules, algorithms, threshold values, or other techniques for determining the regression angle 126 based on the model angular value 128 and the input orientation determination 114.

An output module 132 associated with the image generation server(s) 108 may generate an output image 102 based on the input image 104, the determined model 122, and the regression angle 126. For example, the output image 102 may depict the portion of the body shown in the input image 104, with the determined model 122 rendered in an orientation based on the regression angle 126. Rendering of the model may include generating the output image 102 based on the regression angle 126 as well as data associated with the 3D model, such as geometry, texture, and so forth. In some cases, the rendering process may include use of specific rendering programs, a Graphics Processing Unit (GPU), and so forth. The output image 102 based on the rendered model may depict the item superimposed over a region of the output image 102, such that the output image 102 provides the appearance of the individual depicted in the input image 104 wearing the item. The orientation of the determined model 122 within the output image 102 may be determined based on the regression angle 126, such that the represented item appears correctly aligned and oriented relative to the body of the individual depicted in the output image 102. Because the determined model 122 was rotated a smaller distance, based on the regression angle 126, when compared to the larger distance a model representing a primary viewpoint of the item would be rotated to correspond to the orientation associated with the input image 104, the accuracy of the placement of the item in the output image 102 may be improved, reducing misalignment of the item and other negative user experiences. Additionally, because the determined model 122 may be viewed from any angle such that views depicting each side of the item are available, the output image 102 may depict the item from a variety of viewpoints, and a different output image 102 may be generated using the process described herein as the user or other individual moves, causing a different orientation of the depicted portion of the body to be presented in an input image 104.

Figure 2A:
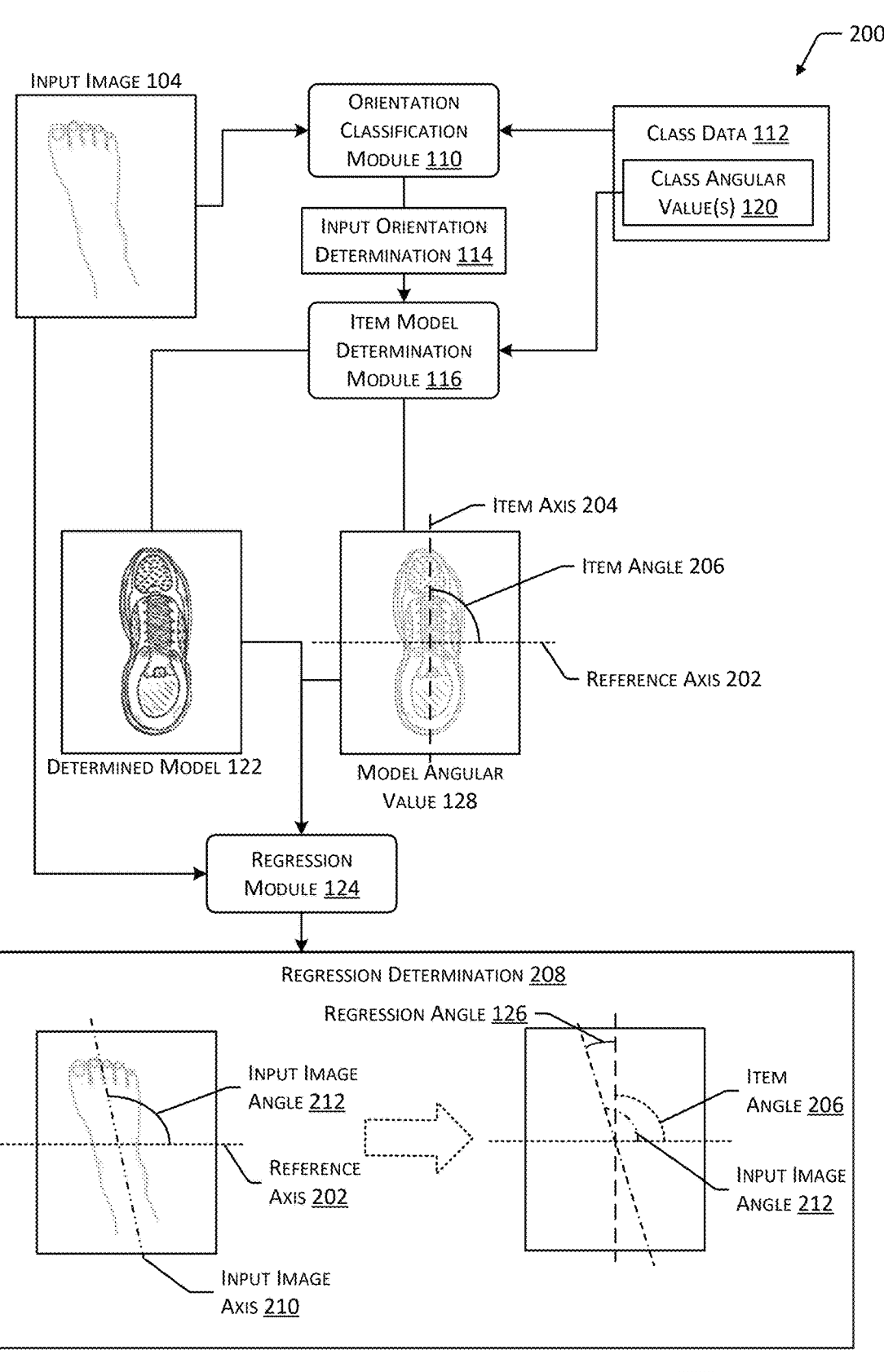
FIGS. 2A and 2B are diagrams depicting an implementation of a system for determining an output image by performing a classification and regression process on an input image and an image of an item.
Figure 2B:
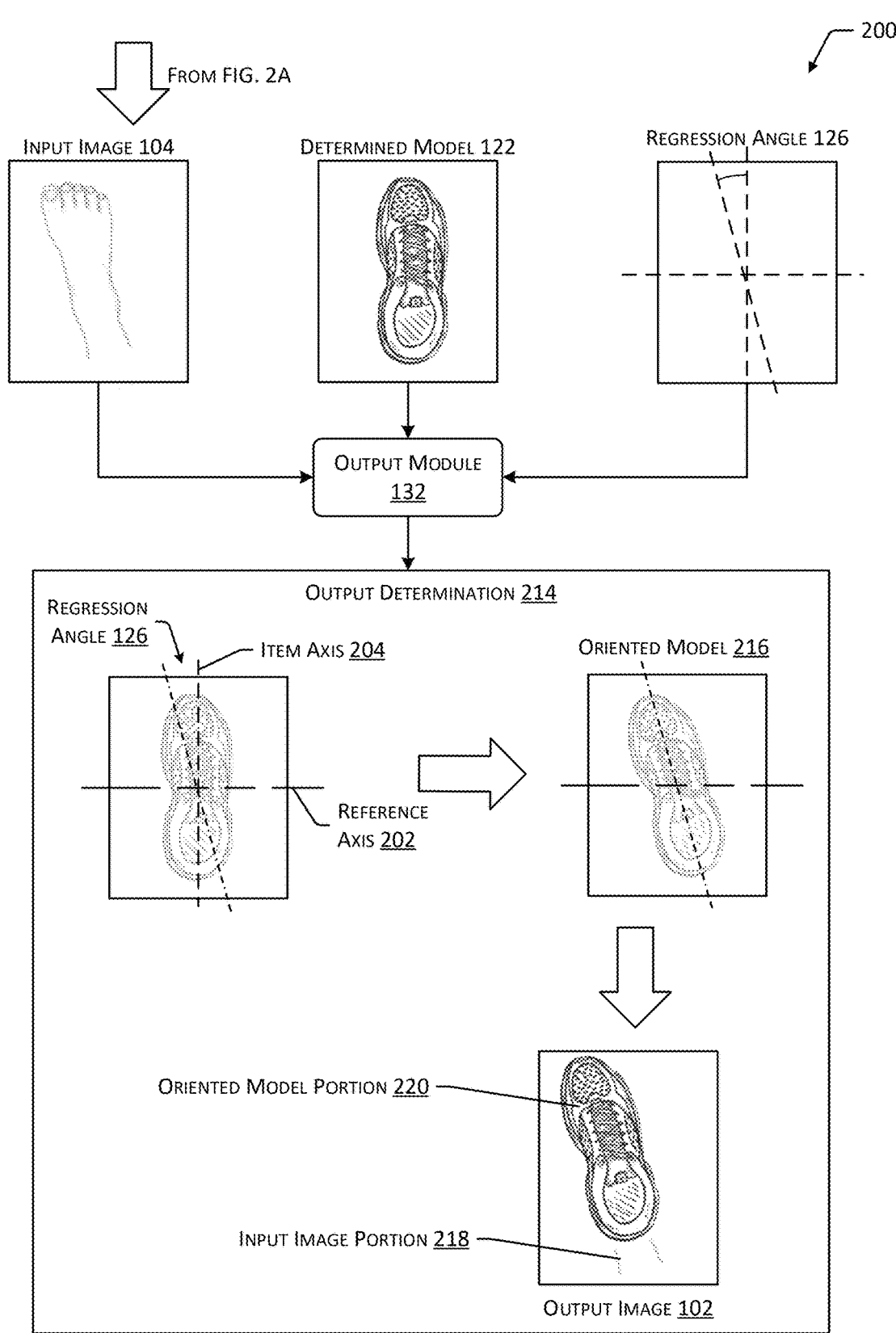

FIGS. 2A and 2B are diagrams 200 depicting an implementation of a system for determining an output image 102 by performing a classification and regression process on an input image 104 and an image of an item. As shown in FIG. 2A and described with regard to FIG. 1, an orientation classification module 110 may receive an input image 104 depicting a portion of a body of a user. The orientation classification module 110 may determine an input orientation determination 114 based on the input image 104 and class data 112 indicative of one or more classes or categories, each class associated with a respective orientation and one or more respective class angular values 120. An item model determination module 116 may determine a particular 3D model (e.g., determined model 122) and a particular angular value (e.g., model angular value 128) that correspond to the input orientation determination 114.

For example, FIG. 2A depicts the input image 104 as a top view of a foot of a user, positioned generally vertically but angled slightly left of vertical. The determined class that corresponds to the orientation associated with the input image 104 may be associated with a class angular value 120 representing an orientation that is most similar to that of the input image 104 from among the orientation classes 118. For example, FIG. 2A depicts the determined model 122 depicting the top side of a shoe that is oriented generally vertically. The model angular value 128 may represent an amount of rotation of the model relative to a reference axis 202. For example, the item represented by the determined model 122 may be associated with an item axis 204, which may include the long axis of the item. An item angle 206 between the item axis 204 and the reference axis 202 may indicate the amount by which the depicted item is rotated relative to the reference axis 202. While FIG. 2A depicts an item that has been rotated along a single dimension relative to the reference axis 202, in other implementations, multiple item angles 206 may be determined, each angle representing rotation of the depicted item relative to a reference axis 202 for a respective dimension.

A regression module 124 may generate a regression determination 208 based on the input image 104 and the model angular value 128. For example, the orientation associated with the portion of the body depicted in the input image 104 may differ from the orientation of the item represented by the determined class. Continuing the example, FIG. 2A depicts the input image 104 having an input image axis 210 that may represent the long axis of the depicted portion of the body, or another axis that intersects the depicted portion of the body. The input image angle 212 between the reference axis 202 and the input image axis 210 may represent the amount of rotation of the depicted portion of the body relative to the reference axis 202. While FIG. 2A depicts the portion of the body rotated along a single dimension relative to the reference axis 202, in other implementations, multiple input image angles 212 about respective axes may be determined.

The regression module 124 may determine the image orientation data 125 that represents the orientation of the portion of the body shown in the input image 104. Based on a difference between the input image angle 212 and the item angle 206, the regression module 124 may determine a regression angle 126 for generation of the output image 102. For example, the regression angle 126 may represent the residual regression, such as an amount of angular rotation, between the item axis 204 and the input image axis 210 such that the orientation of the depicted item represented by the determined model 122 corresponds to that of the depicted portion of the body.

As shown in FIG. 2B, based on the input image 104, the determined model 122 of the item, and the regression angle 126, the output module 132 may generate an output determination 214. For example, based on the regression angle 126 and the determined model 122, the output module 132 may generate an oriented model 216 in which the determined model 122 is rendered at an angle based on the regression angle 126. The output image 102 may include the oriented model 216 positioned in association with the portion of the body depicted in the input image 104, such that the portion of the body appears to be wearing, holding, or otherwise associated with the depicted item. Due to the oriented model 216 having an orientation that corresponds to the orientation of the body depicted in the input image 104, the represented item is shown in alignment with the image of the body. For example, FIG. 2B depicts the output image 102 including an input image portion 218 representing a portion of the body shown in the input image 104, and an oriented model portion 220 representing the oriented model 216 that is positioned in association with the input image portion 218.

Figure 3:
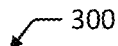
FIG. 3 is a diagram depicting an example implementation of orientation classes that may be determined to correspond to the orientation associated with an input image and may be used to generate an output.

FIG. 3 is a diagram 300 depicting an example implementation of orientation classes 118 that may be determined to correspond to the orientation associated with an input image 104 and used to generate an output image 102. As described with regard to FIGS. 1, 2A, and 2B, an input image 104 may be classified as being similar to one of multiple different orientations, each orientation represented by a class that corresponds to a range of angular values. For example, each orientation class 118 may be associated with each class associated with a respective class angular value 120. A set of class angular values 120 for each orientation class 118 may represent the orientation of the respective class relative to one or more reference axes. For example, a first orientation class 118(1) may represent a primary viewpoint associated with an item. The primary viewpoint may include an orientation that is expected to commonly occur in input images 104. Continuing the example, FIG. 3 depicts the first orientation class 118(1) representing the top side of a shoe, with the shoe oriented upward, representing a common viewpoint that may occur if a user orients a camera downward to place the user's foot within the field of view of the camera. As such a first set of class angular values 120(1) associated with the first orientation class 118(1) may represent rotational values of zero, indicating that the orientation class 118(1) representing the primary viewpoint has not been rotated relative to any reference axes 202.

Each orientation class 118 may represent a respective side of the item having a respective orientation, represented by the class angular values 120 associated with the orientation class 118. For example, a second orientation class 118(2) represents the top side of a shoe, oriented downward, and is associated with class angular values 120(2) representing a rotation about an X-axis relative to the first orientation class 118(1). A third orientation class 118(3) represents the sole or bottom side of the shoe, oriented upward, and is associated with class angular values 120(3) representing a rotation about a Z-axis relative to the first orientation class 118(1). A fourth orientation class 118(4) represents the heel or back of the shoe, oriented upward, and is associated with class angular values 120(4) representing a rotation about a Y axis relative to the first orientation class 118(1)). A fifth orientation class 118(5) representing the back of the shoe, oriented downward, is associated with class angular values 120(5) representing rotations about the Y and Z axes relative to the first orientation class 118(1). A sixth orientation class 118(6) representing the front of the shoe, oriented downward, is associated with class angular values 120(6) representing a rotation about the Y axis relative to the first orientation class 118(1). A seventh orientation class 118(7) representing the front of the shoe, oriented to the right side, is associated with class angular values 120(7) representing rotations about the Y and Z axes relative to the first orientation class 118(1). An eighth orientation class 118(8) representing the bottom of the shoe, oriented downward, is associated with class angular values 120(8) representing rotations about the X and Z axes relative to the first orientation class 118(1). A ninth orientation class 118(9) representing the back of the shoe, oriented toward the right side of the image, is associated with class angular values 120(9) representing rotations about the Y and Z axes relative to the first orientation class 118(1). A tenth orientation class 118(10), representing the back of the shoe, oriented toward the left side, is associated with class angular values 120(10) representing rotations about the Y and Z axes relative to the first orientation class 118(1). An eleventh orientation class 118(11) representing the front of the shoe, oriented upward, is associated with class angular values 120(11) representing rotations about the Y and Z axes relative to the first orientation class 118(1). A twelfth orientation class 118(12) representing the front of the shoe, oriented toward the left side, is associated with class angular values 120(12) representing rotations about the Y and Z axes relative to the first orientation class 118(1). A thirteenth orientation class 118(13) representing a left side of the shoe, oriented upward, is associated with class angular values 120(13) representing rotations about the X and Z axes relative to the first orientation class 118(1). A fourteenth orientation class 118(14) representing a right side of the shoe, oriented upward, is associated with class angular values 120(14) representing rotations about the X and Z axes relative to the first orientation class 118(1). A fifteenth orientation class 118(15) representing a left side of the shoe, oriented downward, is associated with class angular values 120(15) representing rotations about the X and Z axes relative to the first orientation class 118(1). A sixteenth orientation class 118(16) representing a right side of the shoe, oriented downward, is associated with class angular values 120(16) representing rotations about the X and Z axes relative to the first orientation class 118(1).

While FIG. 3 depicts an example set of sixteen orientation classes 118, in other implementations, a larger number of orientation classes 118 that represent additional orientations of an item may be included, or a smaller number of orientation classes 118 may be included to reduce the computational resources associated with classifying input images 104. Additionally, while FIG. 3 depicts class angular values 120 that indicate amounts of rotation relative to three orthogonal axes, rotations relative to any reference axis 202 may be associated with each orientation class 118 or classification. In some implementations, the class angular values 120 may include one or more quaternion values. For example, quaternion values may be represented as a unit hypersphere in which the geodesic distance between two points ($P_1$ and $P_2$) may be represented by the equation: $\cos^{-1}$ ($P_1 * P_2$). In some implementations, the classes determined using the orientation classification module 110 may be determined by partitioning the quaternion space into equal parts, each part associated with a particular class, and each part representing a range of angles. Use of quaternion values to represent orientations of objects in the input image 104 and the orientation classes 118 may avoid disadvantages associated with Euler angles, such as ambiguity and gimbal lock. While rotations of greater than 180 degrees cannot be represented using quaternion values, because each rotation relative to a reference axis 202 may be expressed as a positive or negative value, each rotation may be expressed as an angle of 180 degrees or less.

FIG. 4 is a flow diagram 400 depicting an implementation of a method for determining an output image 102 based on an input image 104 that depicts a portion of a body of a user. At 402, an input image 104 that depicts a portion of a body of a user in a first orientation is received. As described previously, the input image 104 may be acquired using one or more cameras associated with a user device 106, which may send the input image 104 to one or more image generation servers 108 using one or more networks. For example, the image generation server(s) 108 may be associated with an online store or other entity that offers items for purchase, lease, examination, and so forth, and the input image 104 may be received using an interface associated with generation of output images 102 that depict items in association with elements of the input image 104.

At 404, the input image 104 may be classified as a determined class based on the characteristics of the input image 104. For example, a classifier or other type of computer vision or machine learning system may determine portions of the input image 104 that include the body, such as through use of a segmentation process or other type of image analysis. The orientation of the portion of the body may then be classified using a system that is trained to determine confidence scores that associate an input image 104 with various classes, each class representing a respective orientation. The class may be associated with one or more class angular values 120 that represent a rotation of the orientation represented by the class relative to one or more reference axes 202.

At 406, an item model that corresponds to the first orientation may be determined. For example, the output from the classifier may indicate a high confidence score that the orientation of the depicted portion of the body is similar to a second orientation represented by a particular class. In other implementations, correspondence between the input image 104 and one or more item images, each associated with a respective orientation class 118, may be determined to determine a particular item image that depicts an orientation similar to that of the input image 104. As described with regard to FIG. 3, a set of orientation classes 118 may each correspond to a respective orientation, and each orientation class 118 may be associated with one or more class angular values 120 that represent a rotation of an item relative to one or more reference axes 202. The class that is determined using a classifier or other type of system may represent an orientation that is the most similar to that of the portion of the body depicted in the input image 104, when compared to the other classes. The determined model 122 may be used to generate output images 102 in which a represented item is positioned at an orientation that corresponds to that of the input image 104.

At 408, angular values associated with the determined class may be determined. As described previously each class may be associated with one or more class angular values 120 that represent a rotation relative to one or more reference axes 202. The particular class angular value(s) 120 associated with the determined class may be used to determine differences between the orientation of the represented item and the orientation of the body depicted in the input image 104.

At 410, a regression angle 126 may be determined based on a difference between the first orientation associated with the input image 104 and the class angular values 120 associated with the determined class. As described with regard to FIGS. 2A and 2B, the orientation associated with the portion of the body depicted in the input image 104 may differ from the orientation of the item associated with the determined class. For example, an amount of rotation between an axis of the body depicted in the input image 104 and a reference axis 202 may differ from the amount of rotation between an axis of the item represented by the orientation class 118 and the reference axis 202. Based on a difference between these amounts of rotation, which may be represented as angles between the reference axis 202 and the axis associated with each image, a regression angle 126 may be determined. As described with regard to FIGS. 1 and 2A, a regression module 124 may determine image orientation data 125 that represents the orientation of the portion of the body shown in the input image 104. The regression angle 126 may be determined based on the image orientation data 125 and the model angular value 128 associated with the orientation class 118 for the input image 104. The regression angle 126 may represent the residual regression, such as an amount of angular rotation, between the axis associated with the determined class and the axis associated with the input image 104.

At 412, an oriented model 216 may be generated based on the regression angle 126. For example, an oriented model 216 may be rendered at an orientation based on the regression angle 126. Because the regression angle 126 represents a difference between the orientation of the determined class and the orientation of the body in the input image 104, the orientation of the item represented by the oriented model 216 corresponds to that of the input image 104. Because the determined model 122 was rotated a smaller amount between the orientation associated with the determined class and the orientation associated with the input image 104, the output image 102 may more accurately align the represented item with the body of the user in the input image 104 when compared to the amount of rotation that would be used if the determined model 122 were rotated a larger distance between the orientation of the primary viewpoint and the orientation of the input image 104.

At 414, an output image 102 that includes the portion of the body from the input image 104 and the item from the oriented model 216 may be generated. The output image 102 may include the oriented model 216 positioned in association with the portion of the body depicted in the input image 104, such that the portion of the body appears to be wearing, holding, or otherwise associated with the depicted item. Due to the oriented model 216 having an orientation that corresponds to the orientation of the body depicted in the input image 104, the image of the item is shown in alignment with the image of the body.

FIG. 5 is a block diagram 500 depicting an implementation of a computing device 502 within the present disclosure. The computing device 502 may include one or more image generation server(s) 108, as described with regard to FIG. 1. However, in other implementations, user devices 106 or one or more other computing devices 502 may perform one or more of the functions described with regard to an image generation server 108. For example, different servers or other computing devices 502 may classify input images 104, perform regression estimation functions, generate output images 102, send user interface data to user devices 106, receive and process user input, and so forth. As such, while FIG. 5 depicts a single block diagram 500, the depicted computing device 502 may include any number of computing devices of similar or different types.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, I/O devices 516 may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, 5G, LTE, and so forth.

The computing device 502 may include one or more buses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices, network attached storage devices, and so forth.

A communication module 524 may be configured to establish communications with one or more other computing devices 502. Communications may be authenticated, encrypted, and so forth.

The memory 518 may also store the classification module 110. The orientation classification module 110 may determine orientations associated with input images 104. For example, the orientation classification module 110 may include one or more classifiers that are trained to determine correspondence between input images 104 and a set of classes or categories that are each indicative of a respective orientation of an item. In other implementations, the orientation classification module 110 may determine correspondence between input images 104 and item images associated with the orientation classes 118. The orientation classification module 110 may also include one or more segmentation networks, computer vision functionality, and so forth, such as for determining portions of an input image 104 that include an object.

The memory 518 may additionally store the item model determination module 116. The item model determination module 116 may determine a particular 3D model that corresponds to the orientation of an object represented by the determined class for the input image 104. For example, each class of the class data 112 may differ from each other class by one or more class angular values 120 that represent rotation of the determined model 122 relative to one or more reference axes 202.

The memory 518 may store the regression module 124. The regression module 124 may determine a regression angle 126 based on a difference between the orientation of the object in the input image 104 and the orientation of the determined class. For example, the determined class may not necessarily be associated with an orientation that is identical to the orientation associated with the input image 104. The class angular value(s) 120 associated with the determined class may represent the amount that the determined model 122 has been rotated relative to one or more of reference axes 202, such as the axes associated with a primarily viewpoint of the item. The regression module 124 may determine the orientation of a portion of a body shown in an input image 104. The regression angle 126 may then be determined based on a difference between the class angular value(s) 120 and the determined orientation associated with the input image 104. For example, the regression angle 126 may represent an amount of rotation to be applied to the determined model 122 to position the represented item in an orientation that corresponds to the orientation of the object depicted in the input image 104.

The memory 518 may also store the output module 132. The output module 132 may generate an output image 102 based on the input image 104, the regression angle 126, and a determined model 122. For example, the output image 102 may depict the portion of the object shown in the input image 104, with the model representing the item in an orientation that corresponds to that of the input image 104 and superimposed over a region of the output image 102. For example, the determined model 122 may be oriented based on the regression angle 126, such that the depicted item appears correctly aligned and oriented relative to the object. Because the determined model 122 is rotated a smaller distance, based on the regression angle 126, when compared to the larger distance between a primary viewpoint and an orientation associated with the input image 104, the accuracy of the placement of the item in the output image 102 may be improved.

Other modules 526 may also be present in the memory 518. For example, other modules 526 may include permission or authorization modules for sending data to or receiving data from the computing device 502, for modifying configurations or settings, and so forth. Other modules 526 may also include encryption modules to encrypt and decrypt communications between computing devices 502, authentication modules to authenticate communications sent or received by computing devices 502, user interface modules to generate interfaces for presenting output, receiving input from users, and so forth. Other modules 526 may also include training modules for training various machine learning algorithms, such as classifiers, segmentation networks for image analysis, regression estimators, and so forth.

Other data 528 within the data store(s) 522 may include configurations, settings, preferences, and default values associated with computing devices 502. Other data 528 may also include encryption keys and schema, access credentials, and so forth. Other data 528 may include various rules, algorithms, and thresholds for performance of various tasks. Other data 528 may include training data and parameters for various machine learning networks.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more non-transitory memories storing computer-executable instructions; and
one or more hardware processors to execute the computer-executable instructions to:
receive a first image depicting a portion of a body of a user in a first orientation;
provide the first image to a classifier, wherein the classifier accesses a plurality of classes, each class of the plurality of classes representing a respective orientation of an item, and each class of the plurality of classes being associated with a respective angular value relative to a reference axis, and wherein the classifier determines a determined class of the plurality of classes having a second orientation that corresponds to the first orientation;
determine an angular value that is associated with the determined class;
determine a regression angle based on the first orientation and the angular value;
determine a third orientation of the item based on the regression angle, wherein the third orientation corresponds to the first orientation;
render a three-dimensional (3D) model representing the item at the third orientation; and
generate, based on the first image, the 3D model, and the regression angle, a second image that depicts the item in association with the portion of the body of the user, wherein the item is depicted in the third orientation.

2. The system of claim 1, wherein each class of the plurality of classes corresponds to a range of angles, the determined class corresponds to a midpoint of the range of angles, and the third orientation is determined based on a difference between an angle associated with the first orientation and the midpoint of the range of angles.

3. The system of claim 1, wherein each respective orientation and the third orientation comprise a respective quaternion value.

4. A system comprising:
one or more non-transitory memories storing computer-executable instructions; and
one or more hardware processors to execute the computer-executable instructions to:
receive a first image depicting a portion of a body of a user in a first orientation;
determine, using a machine learning system that is trained to classify input images as corresponding to one or more of a plurality of classes based on characteristics of pixels in the input images, a second orientation of an item that corresponds to the first orientation, wherein the second orientation is associated with a first angular value relative to a reference axis;
determine a third orientation for the item based on the first orientation and the first angular value;
render a three-dimensional (3D) model representing the item at the third orientation; and
generate an output, based on the 3D model and the first image, that depicts the portion of the body of the user in association with the item having the third orientation.

5. The system of claim 4, wherein the machine learning system determines correspondence between the first orientation and a plurality of classes, wherein each class of the plurality of classes is associated with a respective orientation, and wherein the second orientation is determined based on correspondence between the first orientation and a first class of the plurality of classes.

6. The system of claim 4, wherein the machine learning system determines at least a first confidence score associated with correspondence between the first image and a first class associated with the second orientation and a second confidence score associated with correspondence between the first image and a second class associated with a fourth orientation, and wherein the second orientation is determined based on the first confidence score.

7. The system of claim 4, wherein each class of the plurality of classes corresponds to a respective image of a plurality of images, each image of the plurality of images is associated with a respective orientation, and wherein each image of the plurality of images is associated with a respective angular value that corresponds to the respective orientation.

8. The system of claim 7, wherein each image of the plurality of images depicts a respective side of the item, and wherein the item is depicted in the respective orientation.

9. The system of claim 7, wherein the plurality of images includes at least:

a second image depicting a top side of the item in the second orientation;

a third image depicting the top side of the item in a fourth orientation that differs from the second orientation;

a fourth image depicting a bottom side of the item in a fifth orientation;

a fifth image depicting the bottom side of the item in a sixth orientation that differs from the fifth orientation;

a sixth image depicting a front side of the item in a seventh orientation;

a seventh image depicting the front side of the item in an eighth orientation that differs from the seventh orientation;

an eighth image depicting the front side of the item in a ninth orientation that differs from the seventh orientation and the eighth orientation;

a ninth image depicting the front side of the item in a tenth orientation that differs from the seventh orientation, the eighth orientation, and the ninth orientation;

a tenth image depicting a rear side of the item in an eleventh orientation;

an eleventh image depicting the rear side of the item in a twelfth orientation that differs from the eleventh orientation;

a twelfth image depicting the rear side of the item in a thirteenth orientation that differs from the eleventh orientation and the twelfth orientation;

a thirteenth image depicting the rear side of the item in a fourteenth orientation that differs from the eleventh orientation, the twelfth orientation, and the thirteenth orientation;

a fourteenth image depicting a left side of the item in a fifteenth orientation;

a fifteenth image depicting the left side of the item in a sixteenth orientation that differs from the fifteenth orientation;

a sixteenth image depicting a right side of the item in a seventeenth orientation; and a seventeenth image depicting the right side of the item in an eighteenth orientation that differs from the seventeenth orientation.

10. The system of claim 4, wherein the first angular value corresponds to a first angle between a reference axis and an axis associated with the second orientation, the system further comprising computer-executable instructions to:

determine a difference between the first angle and a second angle associated with the first orientation;

wherein the third orientation is determined based on the difference.

11. The system of claim 4, wherein the first image is received from a computing device at a first time, the system further comprising computer-executable instructions to:

at a second time, receive from the computing device a second image depicting the portion of the body of the user in a fourth orientation that differs from the first orientation;

determine, using the machine learning system, a fifth orientation for the item that corresponds to the fourth orientation, wherein the fifth orientation is associated with a second angular value that differs from the first angular value;

determine a sixth orientation for the item based on the fourth orientation and the second angular value;

render the three-dimensional (3D) model representing the item at the sixth orientation; and generate a second output, based on the 3D model and the fourth orientation, that depicts the body of the user in association with the item having the sixth orientation.

12. The system of claim 4, wherein the second orientation and the third orientation each comprise a respective quaternion value.

13. The system of claim 4, wherein the item is a wearable item and the output depicts the item being worn by the portion of the body of the user.

14. A system comprising:

one or more non-transitory memories storing computer-executable instructions; and one or more hardware processors to execute the computer-executable instructions to:

receive a first image depicting a first object in a first orientation;

determine correspondence between the first orientation and a plurality of classes, wherein each class of the plurality of classes is associated with a respective orientation;

determine, based on the correspondence between the first orientation and a first class of the plurality of classes, a second orientation, for an item, that corresponds to the first image, wherein the second orientation is associated with a first angular value relative to a reference axis;

determine a third orientation, for the item, based on the first orientation, the second orientation, and the first angular value;

determine a three-dimensional (3D) model that represents a second object at the third orientation; and generate an output based on the first image, the first angular value, and the 3D model, wherein the output depicts the second object in the third orientation.

15. The system of claim 14, further comprising computer-executable instructions to:

use a machine learning system that is trained to classify input images based on characteristics of pixels in the input images to determine at least:

a first confidence score associated with correspondence between the first image and the first class; and a second confidence score associated with correspondence between the first image and a second class of the plurality of classes;

wherein the second orientation is further determined based on the first confidence score.

16. The system of claim 14, wherein each class of the plurality of classes is associated with a respective image of a plurality of images, wherein each image of the plurality of images depicts a respective side of the second object in a respective orientation, and wherein each image of the plurality of images differs from each other image by at least one of the respective side or the respective orientation.

17. The system of claim 16, wherein one or more of the respective orientation or the first angular value is represented as a quaternion value.

18. The system of claim 14, further comprising computer-executable instructions to:

determine a difference between the first angular value and the first orientation; and determine the third orientation based at least in part on the difference.

19. The system of claim 14, wherein:

the first object is a portion of a body of a user;

the second object includes a wearable item; and the output depicts the wearable item being worn on the portion of the body of the user.

20. A system comprising:

one or more non-transitory memories storing computer-executable instructions; and one or more hardware processors to execute the computer-executable instructions to:

receive a first image depicting a portion of a body of a user in a first orientation;

determine a second orientation of an item that corresponds to the first orientation, wherein the second orientation is associated with a first angular value that corresponds to a first angle between a reference axis and an axis associated with the second orientation;

determine a difference between the first angle and a second angle associated with the first orientation;

determine a third orientation for the item based on the first orientation, the first angular value, and the difference;

render a three-dimensional (3D) model representing the item at the third orientation; and generate an output, based on the 3D model and the first image, that depicts the portion of the body of the user in association with the item having the third orientation.

* * * * *